Aug. 26, 1941.   R. N. BURCKHALTER   2,253,685
FILTER
Filed May 14, 1938   3 Sheets-Sheet 3

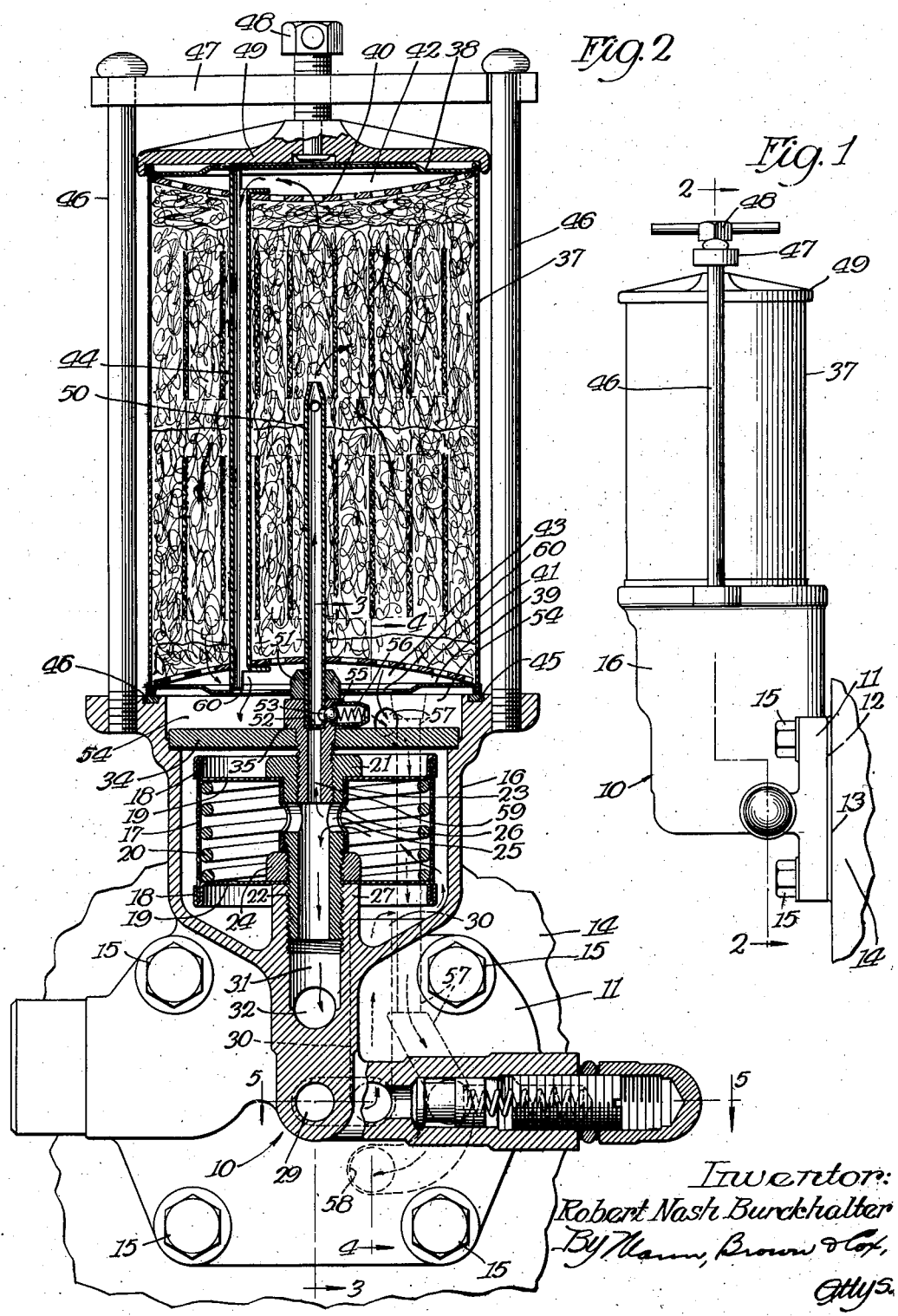

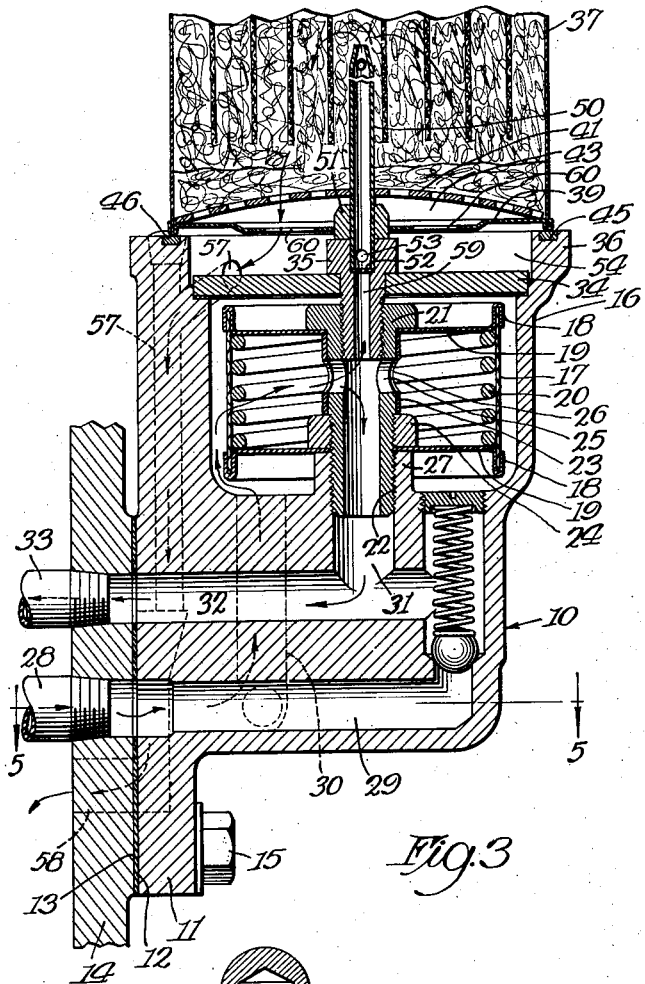

Inventor:
Robert Nash Burckhalter
By Mann, Brown, & Cox.
Attys.

Patented Aug. 26, 1941

2,253,685

UNITED STATES PATENT OFFICE 2,253,685

FILTER

Robert Nash Burckhalter, Michigan City, Ind., assignor to Michiana Products Corporation, Michigan City, Ind., a corporation of Indiana Application May 14, 1938, Serial No. 207,893

4 Claims. (Cl. 210—131)

Improvements in internal combustion engines have brought a new problem in filtering a greatly increased amount of lubricating oil to remove solids that injure bearings and also impalpable solids such as colloidal carbon, that will pass through the bearing clearances, but discolor the oil because, for obvious reasons, it is not practical to do such an increase in filtering by merely making the apparatus larger.

The principal object of this invention is to solve that problem which is achieved in the illustrative apparatus here disclosed by combining a relatively small metallic filter in the high pressure line leading to the bearings with a relatively large fibrous filter in a low pressure slow flowing shunt line, or branch, from the high pressure line to the reservoir or crank case sump from which the circulating pump is supplied.

The small metallic filter will pass the necessary oil while excluding substantially all the solids injurious to bearings and the speed of flow will take substantially all the impalpable solids through that filter. The large fibrous filter will continually clear the impalpable solids from a portion of the oil without retarding the normal flow to the bearings regulated by the pump limiting valve. The light pressure on the loose fibrous mass of this unit and the slow flow through it allows the material to remain loose, open and permeable, whereas high pressure would make it so compact that impalpable solids would be stopped at or near the surface, and the area would have to be greatly increased.

The injurious solids are removed from the oil supply to the bearings and other parts to be lubricated without noticeably affecting the flow of oil and the impalpable solids are cleaned from the slow moving stream at a rate sufficient to keep the oil clear.

In the drawings

Fig. 1 is a side elevation of one form of filtering apparatus shown mounted on the fragment of an engine crank case;

Fig. 2 is an enlarged vertical section on the line 2—2 of Fig. 1;

Figures 6, 7, 8:
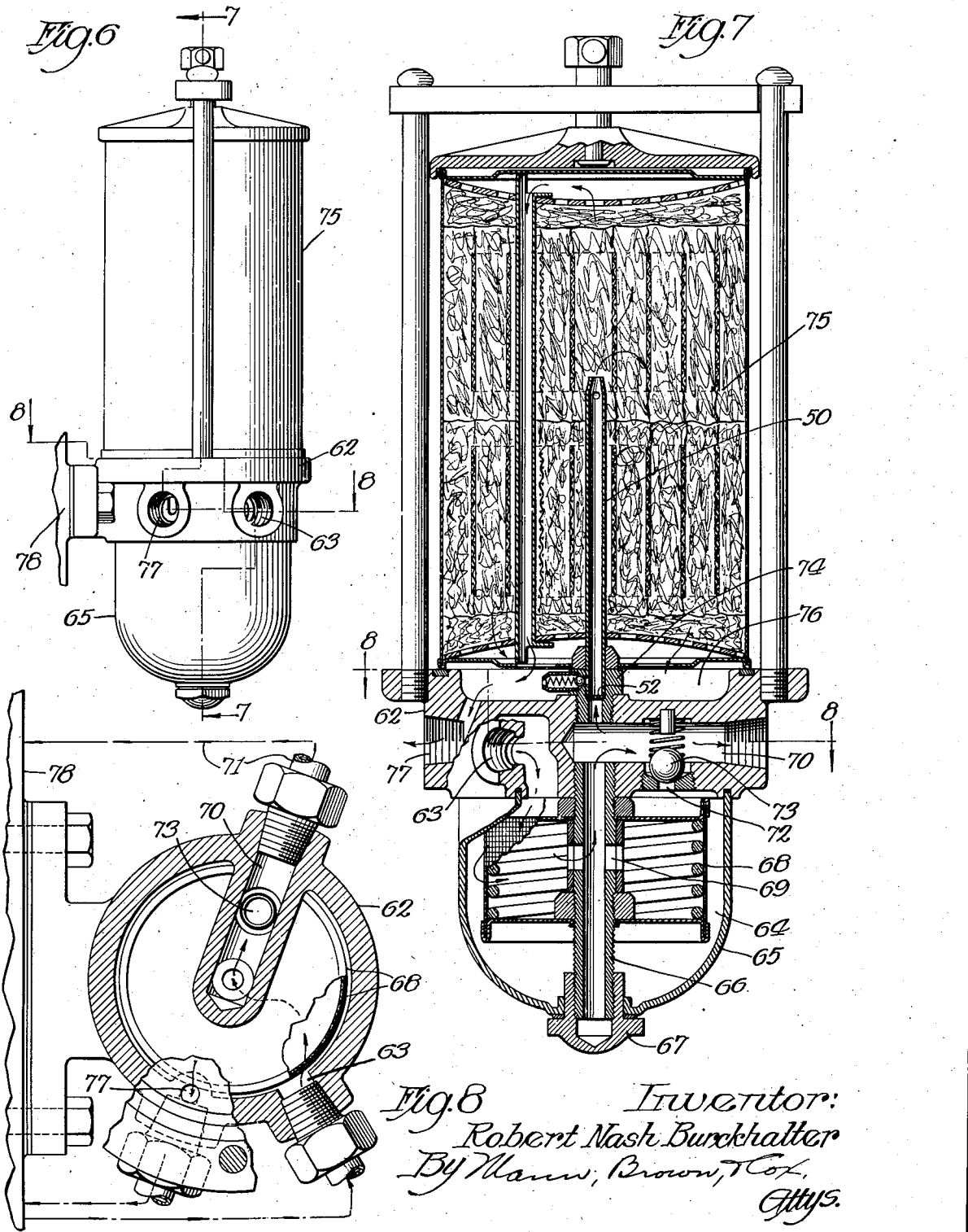

Figs. 3 and 4 are vertical sections in lines 3—3 and 4—4 of Fig. 2;

Fig. 5 is a horizontal section taken on the line 5—5 of Fig. 3;

Fig. 6 is a side elevation similar to Fig. 1, of an alternative form, also shown mounted on a fragment of an engine crank case;

Fig. 7 is an enlarged vertical section on line 7—7 of Fig. 6, and

Fig. 8 is a horizontal section on the line 8—8 of Fig. 7.

But these specific illustrations and the corresponding description are used for the purpose of disclosure only and are not intended to impose unnecessary limitations on the claims.

The base of the apparatus shown in the first two sheets of drawings is a casting 10, having a flange 11 provided with a machined face 12, adapted to be secured against a similar face 13 on the engine casing or block 14, by means of bolts 15.

The upper part of the casting comprises a cup-shaped chamber 16 which will be called a primary filter chamber because within it oil for the parts to be lubricated is filtered to remove organic matter that is injurious to the bearings. The primary filter element for accomplishing this result is preferably made according to the patent to Burckhalter et al., No. 2,031,589 of February 25, 1936. It consists of a barrel 17 of woven wire, the ends of which are gripped by the crimped edges 18 of sheet metal heads 19. Between the heads the wire is sustained against inward pressure by a grating formed of a stiff wire spring 20. At the center the heads have aligned openings to receive a hollow bolt 21 threaded at 22. The upper head is clamped between the head of the bolt and a spacer sleeve 23 by a nut 24. The sleeve and the bolt have aligned openings 25 and 26 to make communication between the interior of the filter element and the hollow of the bolt.

The assembly on the bolt makes a unit that is mounted by screwing the projecting end of the bolt into an internally threaded boss 27 at the middle of the chamber 16.

Oil to be filtered is delivered by pipe 28, which communicates with a passage in the base that includes a horizontal bore 29 and a vertical bore 30 leading to the interior of the chamber 16, as best seen from Figs. 3 and 4. The outlet portion of the passage is a vertical bore 31 coaxial with the boss 27 and a horizontal bore 32 (Fig. 3) leading to a pipe 33 by which the oil is communicated to the bearings.

The whole oil passage may be called a series oil passage, for by it the primary filter element is put in series with the bearings and other parts it is to protect.

The oil entering the chamber 16 from the passage 30 goes through the barrel 17, passes into the hollow of the bolt 21 and out through the horizontal passage 32.

The preferred material for the barrel 17 is woven wire having 208 vertical wires per inch of circumference, each about .005 inch in diameter and 16 horizontal wires per vertical inch about .007 inch in diameter. The virtue of this construction is set forth in the patent to Burckhalter, et al., No. 2,031,589 of February 25, 1936, to which reference is made for a fuller description. It will be sufficient here to say that the wall is very permeable to warm oil, such as ordinarily used in internal combustion engines, but excludes practically all the solid matter that is injurious to bearings. It will pass the oil so rapidly and with such little friction that the required amount can go through without materially increasing the pressure in the line. The area should be chosen to keep the movement of oil through this filter at a high rate of speed in order to prevent impalpable solids, such as colloidal carbon, from tending to collect at the surface and thus form an obstructing filter bed. About 14 square inches of filter surface is sufficient for 20 gallons of oil per minute. Of course, different conditions will require some differences in these figures.

Some engineers will prefer primary filter elements of the type disclosed in the patent to Liddell, No. 2,042,537 of June 2, 1936, and the British patent to Gobbi, No. 30,303 of 1909. The use of such filters is contemplated in the combinations embodying this invention.

The upper end of the primary filter chamber 16 is closed by a disk or cover 34, made fast by a hollow bolt or nipple 35, threaded into the head portion of the bolt 21. The rim 36 of the chamber 16 extends above the disk 34 to form a base for the secondary filter, the purpose of which is to remove impalpable solids from the oil and particularly colloidal carbon.

A mass of shredded cotton or cotton waste, wool, a mixture of wool and cotton, or cattle hair and cotton, or cattle hair and asbestos fiber, or cotton and mineral wool, or various other fibrous materials, when put under sufficient pressure to make the mass somewhat springy, while dry, will make a good filter for this purpose.

The form of the filter may be various. As shown, the filter includes a cylindrical barrel 37 of sheet metal having upper and lower heads 38 and 39, crimped about the ends of the barrel and soldered, welded, or otherwise made fast and oil tight. For a detailed description see my copending application, Serial No. 131,558, filed March 18, 1937.

Just inside the heads 38 and 39 are perforated or reticulated heads 40 and 41, concavo-convex in shape and of a diameter approximately equal to the inside diameter of the barrel 37. These heads cooperate with the heads 11 and 12 to form small chambers 42 and 43. Between the heads 40 and 41 is the filter element composed of layers of fibrous material and woven wire, expanded metal, or such like. The fibrous material should be selected according to the conditions of use, and for internal combustion engines shredded cotton is preferable as a rule, though individual engineers may wish to make use of a variety of other materials and mixtures of materials.

No actual dimensions, pressures or materials suitable for all uses can be given, but for a barrel about four and one-quarter inches in diameter, a thickness of cotton layer of three-eighths to one-half inch will be about right and three mesh screen made with 00 gauge of galvanized wire has been found satisfactory. The lateral pressure as well as the endwise pressure may be varied within considerable limits, but for high permeability and long life of the filter, the fibers should be in a somewhat loose open condition to provide for easy flow of oil while obstructing all of the entrained material. A depth of cotton of about two inches in the direction of flow is satisfactory, though of course, this can be varied. The fibers should be in loose enough condition to let the solid matter actually enter the mass and gradually work its way toward the outlet end, otherwise the permeability is correspondingly reduced and a larger area is required for a given flow of oil. When solid matter begins to escape the outlet end of the filter, that marks the end of the usefulness of the filter and it should be replaced.

The chambers 42 and 43 are connected by a tube 44, most conveniently placed inside the filter chamber.

Such filters can be mounted in a great variety of ways and deference will have to be made to layout men and engineers. The mounting here shown lends itself to ready replacement of the secondary filter unit.

The upper face of the chamber 16 is machined to a surface and provided with a groove for a sealing gasket 45. The rim of the filter rests upon this gasket and is held against it to make a tight fit by a readily releasable clamp, here shown as including the bolts 46, the cross head 47, a screw 48 and a stiff disk 49, the latter to fit the upper end of the filter.

Oil is delivered to the intermediate portion of the filter material by a tube 50 pressed into the counterbored upper end of the bolt or nipple 35 and surrounded at its base by a collar 51. The heads 39 and 41 have axial openings to receive and fit the tube 50 and the collar 51.

An opening for the tube 50 is made by inserting an air jet and should be temporarily filled by a stick of wood or such like to prevent closing until just before the filter is to be installed. When the tube 44 is inside the casing, as shown, an opening for it through the filter material is also conveniently made by an air jet.

Since the secondary filter is to be discarded when it becomes charged with colloidal carbon, a desirable economy can be effected by making the casing of very light material. For example, 135 pounds tin plate, sold by a well known can manufacturer, which is about .01539 inch in thickness, or approximately 28 gauge. A casing made of that material can be bought very cheaply and serves the purpose well, provided the internal pressure is kept within low limits. In the construction described it should not exceed 30 pounds or there is danger of opening a seam.

In order to limit the pressure within the filter casing the inlet oil is restricted by a disk 52, having a central opening made with a No. 52 drill. Of course, with this construction cold oil, or a clogged filter element, could result in high pressure within the chamber. For that reason a relief passage 53 is provided to connect the inlet with the chamber 54 above the disk 34 and the passage is normally closed by a ball check valve 55, urged to its seat by spring 56 with just sufficient pressure to let the valve open when the pressure in the casing 37 reaches about 30 pounds. Oil will then flow from the inlet passage 59 through the relief passage into the chamber 54 and from thence through a passage 57 (Fig. 4) through the base to a passage 58 leading back to the sump or reservoir.

This relief passage and valve must be distinguished from the bypass across the filter that has heretofore been used to insure a flow of oil to the bearings even though the oil is cold or the filter is clogged, for such passages will permit pressure to develop in the filter casing of 100 pounds or more, which would be too much for the casing of the construction preferred for economy.

Oil to the secondary filter is supplied from the main/series stream by the hollow or bore 59 in the bolt 35. It passes up through the inlet tube 50 to the intermediate portion of the filter element where it spreads out and forms into two streams, one flowing upwardly to the chamber 42 and thence downwardly through the tube 44, while the other flows downwardly through the filter material to join the first stream in the chamber 43. Then it passes out through openings 60 in the head 39 into the chamber 54 and back to the reservoir through the passages 57 and 58.

Generally speaking, the pressure across the secondary filter should not be more than 15 or 20 pounds and the filter should be of sufficient size to accumulate the colloidal carbon through a run of from 8,000 to 10,000 miles. The end of the useful life of the filter will be marked by a darkening of the oil, at or before which time the secondary filter should be replaced by a new one. Ordinarily the primary filter will require no replacement. The sediment collected in the chamber 16 can usually be thrown off after removing the usual drain plug, not shown.

Figs. 6, 7 and 8 show an alternative form in which the primary filter is below and the secondary filter is above a base 62, in this instance shown equipped for outside piping. Oil from the pump enters a port 63, passes downwardly into a primary filter chamber 64, formed by the lower portion of the base 62, and a casing 65 secured to the base by a threaded tube 66 and a cap nut 67. Passing through the primary filter 68 the oil enters ports 69 in the tube 66 and rises to an outlet passage 70, connected with tubing 71, leading to the bearings and the other parts to be lubricated. This passage and the primary filter chamber is connected by a bypass 72 equipped with a suitable check valve 73. Oil for the secondary filter leaves the passage 70 through a nipple 74, equipped with a restriction disk 52 to an inlet tube 50 leading to a secondary filter 75 corresponding in all respects to the one described in connection with the first two sheets of drawings. From this filter the oil flows into a chamber 76 corresponding to the chamber 54 and escapes through a passage 77 to piping leading back to the reservoir.

This modified form of filter is intended to be mounted on the engine casing, or dash, or other suitable place indicated at 78. Of course, it will be obvious that the arrangement of the primary filter below and the secondary filter above can be readily embodied in a base of the type shown in sheets 1 and 2 of the drawings, for direct connection with the engine casing, or block, and provided with internal passages. Many other modifications to suit filtering conditions will be readily made by those skilled in the art.

In the forms here illustrated the oil for the secondary filter is taken from the line after being passed through the primary filter, and that is the preferable arrangement because it protects the restriction 52 from being clogged by larger solid particles, but it is not to be understood that this is the only arrangement. In some uses it may be found desirable to take the oil for the secondary filter from some other place.

The apparatus here illustrated is particularly intended for use in the lubrication system of internal combustion engines, as described by these illustrations and the corresponding description, but it is not intended to limit the claims to that particular use for obviously air compressors and a variety of other things can be well lubricated with the same system.

In the form shown in sheets 1 and 2, a known pump limiting valve A is illustrated and will be sufficiently understood from the drawings. It is convenient to have that valve in the base of the filter but personal preference may put it elsewhere.

I claim as my invention:

1. In a lubricating system for internal combustion engines having oil contaminated with impurities including solids injurious to bearings and impalpable solids such as colloidal carbon, a filtering apparatus including a base having a primary filter chamber having thick walls for resisting high pressures, a seat for a secondary filter in said base, an inlet for oil for the filter chamber, a primary outlet for said chamber for oil flowing to the parts to be lubricated, and a secondary outlet for conducting oil to a reservoir from said chamber, a primary filter element within the filter chamber connected in series with the inlet and the primary outlet for oil flowing to the parts to be lubricated and excluding solids injurious to bearings while passing impalpable solids, a by-pass between said inlet and primary outlet, a relief valve in said by-pass for by-passing oil around said primary filter when the pressure therein rises above a predetermined maximum, a secondary filter unit including a single casing of thin sheet metal mounted on said seat, means for detachably holding said casing on said seat, a secondary filter element permanently contained in the casing, a conduit for conducting a portion of the oil discharged from the primary filter to the secondary filter, an enlarged outlet for said secondary filter for conducting filtered oil from said secondary filter to said secondary outlet, said secondary filter being between said last named conduit and said enlarged outlet and in series therewith, a greatly restricted passage in said conduit, a second by-pass having a low resistance to the flow of oil between said conduit and said secondary outlet, said by-pass being located between said restricted passage and said secondary filter, and a safety valve within said second by-pass between said restricted passage and said secondary filter for shunting oil around said secondary filter when the pressure therein exceeds a predetermined amount materially below that on the inlet side of said restricted passage.

2. In a lubricating system for internal combustion engines having oil contaminated with impurities including solids injurious to bearings and impalpable solids such as colloidal carbon, a filtering apparatus including a base having an inlet and having a primary outlet for filtered oil flowing from said apparatus to parts to be lubricated, a primary filter comprising a chamber carried by the base, a primary filter element in the chamber between said inlet and outlet for excluding substantially all the solids injurious to bearings while passing substantially all impalpable solids, the base having a secondary outlet passage for conducting oil to an oil reservoir, a secondary filter comprising a chamber of thin sheet metal forming a single wall reservoir carried by the base and connected between the two outlets, a secondary filter element permanently contained in the secondary chamber retaining substantially all colloidal carbon, means for removably clamping said secondary filter chamber to said base whereby when said secondary filter becomes clogged the same may be inexpensively replaced, a passage having a restriction therein for conducting a portion only of the oil passing through said primary filter and first named outlet to the secondary chamber, and means having low resistance to the flow of oil and including a pressure relief valve between said restriction and secondary filter for preventing the pressure within said secondary chamber from rising above a predetermined pressure far below that within said primary chamber, an enlarged outlet for said secondary filter in series with said last named filter and said restriction and in communication with said secondary outlet passage, said secondary outlet passage being of greater diameter than said restricted passage for preventing the building up of pressure within said secondary filter under normal operation.

3. In a lubricating system for internal combustion engines having oil contaminated with impurities including solids injurious to the bearings and impalpable solids such as colloidal carbon, a filter apparatus for said oil comprising a filtering medium, means including a casting enclosing said filtering medium and having an intake passage for conducting oil to the filtering medium and an outlet passage for conducting filtered oil from the filtering medium to the bearings of the engine, said casting having a groove on the underside thereof, a reservoir detachably engaging said groove and in communication with said intake passage, said filtering medium comprising a cylindrical member having a wire gauze side wall and imperforate end walls, a helical spring within said member for yieldingly holding said wire gauze in extended condition, a tubular member for conducting oil from said filtering medium to said outlet passage, said means enclosing said filtering medium having a groove on its upper surface, a secondary filter comprising a sheet metal can member having an end seam seated in said last named groove and permanently containing fibrous material, said can member constituting the sole casing for said secondary filter, clamping means for detachably holding said can member on said casting, a shunt passage for conducting oil from said outlet passage to the interior of said fibrous material, a restriction within said shunt passage, a relief valve between said restriction and said can member providing a by-pass having low resistance to the flow of oil for by-passing oil around said secondary filter when the pressure therein rises above a predetermined amount, means for conducting oil passing through said fibrous material back to the crank case of the engine, and a conduit for conducting oil passing through said relief valve across to the conduit leading back to said crank case.

4. In a lubricating system for internal combustion engines having oil contaminated with impurities including solids injurious to the bearings and impalpable solids, such as colloidal carbon, a filter apparatus for said oil comprising a primary filtering medium, means including a casting enclosing said filtering medium and having an intake passage for conducting oil to the filtering medium and a discharge passage for conducting oil from the filtering medium to the bearings of the engine said filtering medium comprising a barrel of woven wire for removing coarser impurities from the oil passing therethrough, a secondary filter comprising a casing removably attached to said means enclosing said primary filtering medium and comprising a single wall chamber of thin sheet metal, a filter of fibrous material permanently contained within the thin sheet metal chamber, a shunt passage for conducting a portion of the oil only from the discharge passage of said primary filtering medium to said secondary filter, a restriction in said shunt passage, an outlet passage for conducting filtered oil from said secondary filter to the crank case of the engine, a by-pass in communication with said shunt passage between said restriction and said secondary filter for conducting oil from said shunt passage to said outlet passage, said by-pass offering a low resistance to the flow of oil therethrough and a pressure relief valve within said by-pass for shunting the last named oil around said secondary filter when the pressure on said valve exceeds a predetermined amount far below that within said discharge passage.

ROBERT NASH BURCKHALTER.